March 5, 1957     A. G. SANGSTER     2,784,357
MAGNETIC POSITIONING AND SUPPORTING DEVICE
Filed June 26, 1952
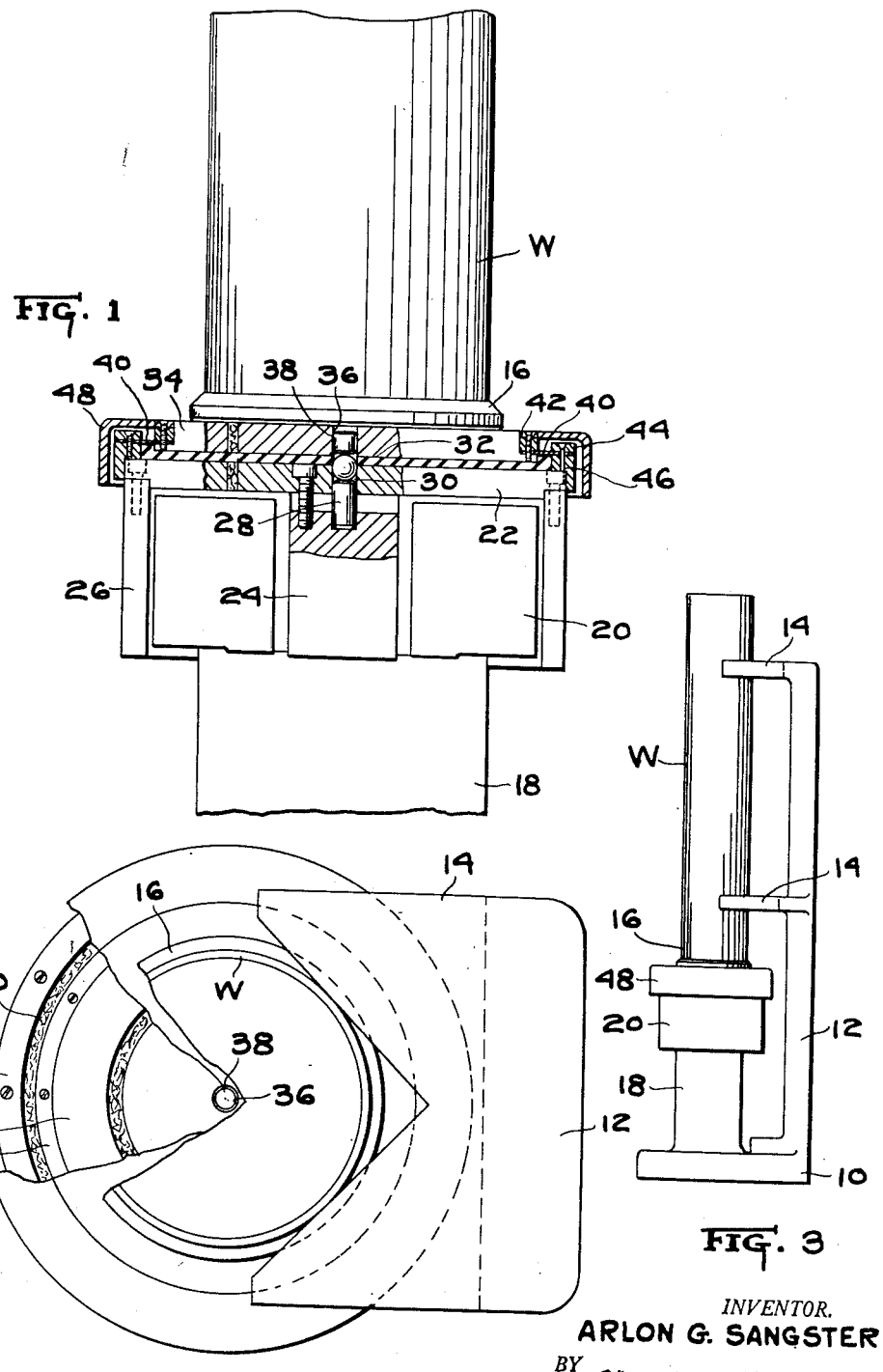
INVENTOR.
ARLON G. SANGSTER
BY
Charles R. Fay,
ATTORNEY United States Patent Office 2,784,357
Patented Mar. 5, 1957

2,784,357
MAGNETIC POSITIONING AND SUPPORTING DEVICE

Arlon G. Sangster, Leominster, Mass., assignor to Arter Grinding Machine Company, Worcester, Mass., a corporation of Massachusetts Application June 26, 1952, Serial No. 295,743

4 Claims. (Cl. 317—159)

This invention relates to a magnetic positioning or supporting device and the principal object of the present invention resides in the provision of an adjustable member which may be accurately positioned as required by the work to be done and which upon the adjustment being attained, is securely locked in position by magnetic means.

One instance in which this device is particularly useful is in the positioning and holding of a work-piece with relation to a surface of the work that is not uniform on each part in the run of production thereof, so that each piece, as it is processed, may be positioned exactly as desired, i. e., according to a prearranged gauge or according to some desired axis, and then the positioning and holding device may be immobilized by the magnetic means so that the work-piece may be processed accurately according to the predetermined gauge setting means or axis.

This invention relates to other operations and includes other constructions, but has been elected to be illustrated herein as comprising a pair of magnetic, permeable members which are adjustable relative to each other and which have interposed therebetween a distortable magnetic substance such as a layer of iron powder and oil mixture or other like substance, filling the gap between the members with a magnetic substance, regardless of the adjustment made between the two permeable members, in combination with a source of magnetic flux, which when impressing magnet flux on the two members, immobilizes the distortable substance and holds the two members in exact relation.

Other objects and advantages of the invention will appear hereinafter.

Reference is to be had to the accompanying drawings, in which:

Fig. 1 is a view in elevation of the device according to the present invention, parts being in section;

Fig. 2 is a plan view thereof, parts being broken away; and

Fig. 3 is a view in elevation on a reduced scale illustrating an operation of the present invention.

Referring first to Fig. 3, there is shown a base or support 10 upon which may be mounted a standard 12 in this case carrying a pair of vertically spaced V blocks 14 which are aligned so as to accurately position for example a cylindrical work-piece w on a vertical axis. The workpiece w in the instance of the invention disclosed herein may have a head or rim, cover, etc. indicated at 16 and supposing that the parts 16 are not uniform in each part of a production run but vary slightly angularly with respect to the general axis of the work-piece w, it will be seen that it will be impossible to merely support the work-piece w on a flat table and have them all serially arranged on a common axis. However, by placing each cylindrical work-piece w against the V blocks as shown in Fig. 3, each such work-piece w will be arranged on the desired single axis for further processing; but the heads, covers, etc. 16 will vary slightly in their angular relationship to the predetermined axis referred to. It may be necessary to support the work-pieces w by the heads 16 and this may be accomplished in all instances by the embodiment of the invention chosen to be illustrated herein.

A support 18 is arranged to mount an electric chuck or other source of magnetic flux generally indicated at 20. This device may take the form of an electric coil or a permanent magnet either of which may be energized or deenergized to direct magnetic flux as required by the particular construction to be described. A magnetic plate 22 having the proper non-magnetic gaps, etc. which may be annular or of any kind desired as is well known in the art, is fixed to the support by any desired means or it may be fixed to a rotating device so that the holder to be described may rotate the work-piece. This support is illustrated at 24 and may either be a part of the coil arrangement or a spearate rotating motive means. A part of this assembly is an annular skirt indicated at 26.

A pin 28 is accurately located centrally of the part 24 and has an upper end located below the top surface of the magnetic plate 22, in a central bore 30. This pin carries a ball or the like 32 which is laterally supported in the bore 30 and the ball 32 forms a swivel or wabble support for another magnetic plate 34 also provided with non-magnetic gaps as may be required. The plates 34 and 22 are vertically spaced by this construction and the plate 34 may wabble or swivel relative to plate 22 so as to provide an angular adjustment relative thereto.

The space between the magnetic plates 34 and 22 is substantially filled with a fluid magnetic substance which may be iron powder and oil in a convenient mixture. Clearly when plate 34 wabbles on its ball 32, the fluid magnetic mixture will be conformed to the changed shape of the gap or space between the two magnetic plates and thus this space will always be filled with magnetic material which easily transmits flux from one plate to the other as will be readily apparent. A convenient way of supporting plate 34 on the ball 32 is to provide a central bore in plate 34 as at 36 and insert and secure a plug 38 therein somewhat comparable to the pin at 28.

A flexible diaphragm or the like sealing means is interposed at the edges of the plates and this seal is indicated at 40 being clamped by an annular ring 42 to one plate and at its other edge being clamped by another angular ring 44 to an external shoulder or the like 46 arranged at the periphery of plate 22. The ring 24 may also provide a support for a protective skirt at 48 also annular and covering the edge of the plate 22 and concealing the diaphragm.

When the work w is thrust against the V blocks 14 or other guide means, the side walls or circumferential surface of the work will determine the axis thereof and the head or cover 16 will swivel the plate 34 to conform to this positioning of the axis of the work-piece. When the flux is passed through plate 22, the permeable distortable fluid, and plate 34, the magnetic fluid becomes solidified and thus a fixed and firm support is formed for the work-piece, which may then be operated upon uniformly as to all work-pieces handled one after the other so far as the axis of the work is concerned.

Non-magnetic work is of course held by mechanical means rather than by the flux, but the action is the same. Also, in some cases, just enough flux may be impressed to only partially solidify the normally fluid magnetic substance, so as to allow for accurate positioning of the work prior to final solidification. In this case, the work and table 34 stay wherever moved, under partial solidification, and then the final or full flux will hold them where wanted.

This invention may assume many other forms without departing from the scope thereof and the proportions and sizes of the two plates, the source of flux, and the size of the gap between the plates may be varied considerably while still providing all of the useful attributes enumerated.

Having thus described my invention and the advantages thereof, I do not wish to be limited to the details herein disclosed, otherwise than as set forth in the claims, but what I claim is:

1. A device of the class described comprising a source of magnetic flux, a magnetically permeable plate connected thereto, means providing for inclination of the member relative to the flux source, means selectively to direct flux from the source to and through the member fixing the latter in selective inclined position relative to the flux source as long as the flux passes into the member, said flux source and said member being spaced, the space being variable as the member is inclined relative to the flux source, a fluid magnetic substance substantially filling the space, and means confining and restraining the fluid magnetic substance to said space.

2. A device of the class described comprising a supporting member, a source of magnetic flux associated therewith, a spindle on the member, a second member swiveled on the spindle in spaced relation to the supporting member, and a mass of fluid material generally filling the space between the members, the latter and the material all being magnetically permeable and forming a magnetic circuit with the flux source.

3. A device of the class described comprising a supporting member, a source of magnetic flux associated therewith, a spindle on the member, a second member swiveled on the spindle in spaced relation to the supporting member, and a mass of fluid material generally filling the space between the members, the latter and the material all being magnetically permeable and forming a magnetic circuit with the flux source, and a flexible diaphragm secured to and between the members and holding the fluid material against escape when the flux is not impressed on the circuit.

4. A device of the class described comprising a base element, a source of magnetic flux, a swivel plate associated with the base element, a normally distortable magnetic substance between the base element and swivel plate and conforming in general to the space therebetween regardless of the adjustment of the swivel plate, and selectively operable means to direct magnetic flux to the magnetic substance to immobilize the same in rigid condition and fix the plate in adjusted position relative to the base element, and a flexible annular diaphragm secured to the element and the plate adjacent the peripheral edges thereof and forming a wall to prevent escape of the distortable magnetic substance when free of magnetic flux.

References Cited in the file of this patent

UNITED STATES PATENTS

| 807,517 | Vance | Dec. 19, 1905 |
| 2,500,953 | Libman | Mar. 21, 1950 |
| 2,575,811 | Hofammann et al. | Nov. 20, 1951 |
| 2,579,896 | Ashley | Dec. 25, 1951 |
| 2,622,713 | Rabinow | Dec. 23, 1952 |
| 2,667,237 | Rabinow | Jan. 26, 1954 |

FOREIGN PATENTS

| 485,592 | Belgium | Nov. 13, 1948 |